US007802666B2

(12) United States Patent
Maino

(10) Patent No.: US 7,802,666 B2
(45) Date of Patent: Sep. 28, 2010

(54) DEVICE FOR PROTECTION AND HANDLING OF ELECTRIC FEED CABLES FOR MOBILE USE

(75) Inventor: Giuseppe Maino, Carugate (IT)

(73) Assignee: Conductix-Wampfler S.r.L., Milan (IT)

( * ) Notice: Subject to any disclaimer, the term of this patent is extended or adjusted under 35 U.S.C. 154(b) by 540 days.

(21) Appl. No.: 11/827,151

(22) Filed: Jul. 10, 2007

(65) Prior Publication Data

US 2008/0048163 A1 Feb. 28, 2008

(30) Foreign Application Priority Data

Jul. 14, 2006 (IT) .......................... MI2006A1369
Jul. 14, 2006 (IT) ......................... MI20060253 U

(51) Int. Cl.
*H02G 11/00* (2006.01)

(52) U.S. Cl. ................. 191/12 R; 191/12 C; 191/22 C; 191/25; 104/140; 104/145; 104/146

(58) Field of Classification Search ............... 191/12 R, 191/12 C, 12.2 R, 12.2 A, 23 R, 24, 25, 22 C, 191/9; 104/140, 142, 143, 145, 146
See application file for complete search history.

(56) References Cited

U.S. PATENT DOCUMENTS 411,496 A * 9/1889 Fraley ...................... 191/23 R
462,672 A * 11/1891 Robertson ................. 191/23 R
535,345 A * 3/1895 Bentley ....................... 191/25
698,099 A * 4/1902 Boughan ..................... 191/25
795,821 A * 8/1905 Craven ........................ 191/25
2,316,064 A * 4/1943 Hans ........................... 191/25
5,556,680 A * 9/1996 Hellman ...................... 428/56

FOREIGN PATENT DOCUMENTS

RU 2 096 306 * 11/1997

* cited by examiner

*Primary Examiner*—Mark T Le
(74) *Attorney, Agent, or Firm*—Buchnam and Archer

(57) ABSTRACT

A device for protection and handling of electric feed cables (20-20') for mobile use, especially for a mobile device (26-26') for lifting and moving loads such as cranes, bridge cranes and the like installed along harbour docks. The device includes a mobile frame (10-10'), made of metal or other suitable material, provided with a central tower (30-30') connected to said mobile device and with opposite arms (32-32'), arranged in alignment on a part of a trench duct or raceway (12-12') buried in the ground with an open top substantially aligned with the surface level (14-14') and screened by a flexible tape (16-16'). At least one of the opposite arms (32-32') is provided with structure for lifting the flexible tape (16-16'), arranged at the top and/or at the bottom of the tape, and structure for guiding and centering the frame (10-10') in cross direction relative to the raceway (12-12').

16 Claims, 10 Drawing Sheets

54
56
67
60
62
66
16

58
64
70
72
F1
Z

FIG. 12
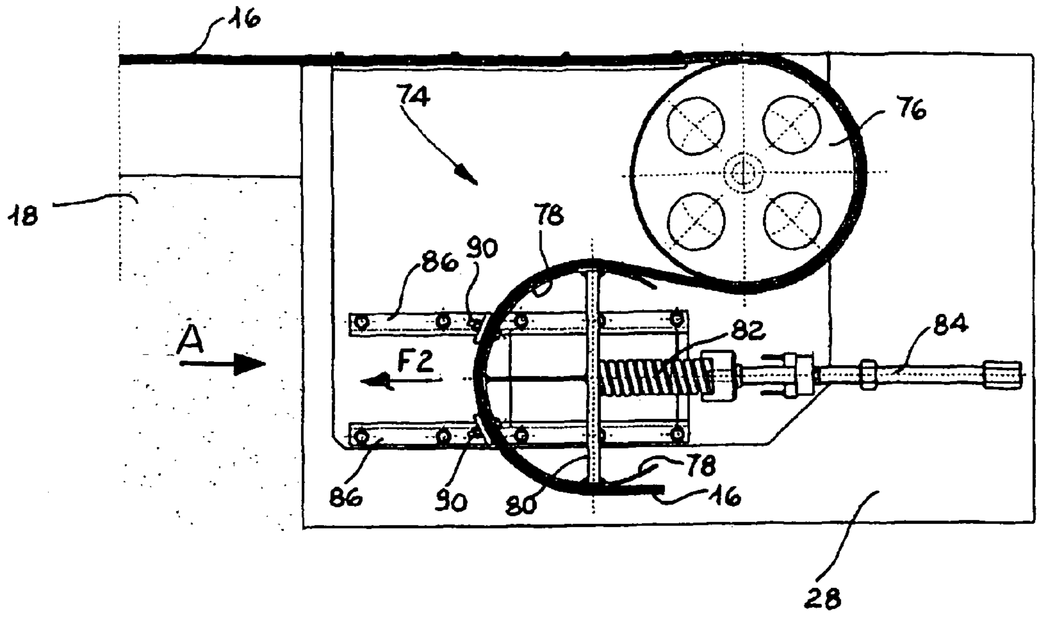
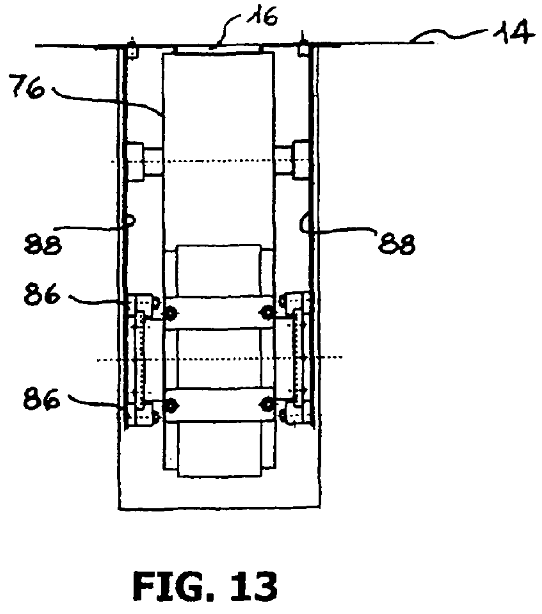
FIG. 13

DEVICE FOR PROTECTION AND HANDLING OF ELECTRIC FEED CABLES FOR MOBILE USE

The present invention relates to a device for protection and handling of electric feed cables for mobile use.

More in particular, the present invention relates to a device for the protection of electric cables arranged in buried raceways and intended for powering mobile means for lifting and moving loads such as cranes, bridge cranes and the like. Devices of this type is typically installed along harbour docks where merchant ships berth, or in production establishments such as steelworks, where the handling of considerable loads and/or volumes arranged in multiple zones of a rectilinearly extended portion is required.

With reference by way of a non-limiting example to harbour docks, where merchant ships and cargo vessels berth, the need of arranging means suitable for handling the goods, for example carried into containers, with considerable weight and volume, is known. The docks, which extend by dozens and sometimes hundreds of meters, require the temporary presence of such handling means on the entire extension thereof. Such need is traditionally met thanks to the arrangement of a sliding line, in the form of tracks or the like, along which said means move according to a rectilinear path, so that a single handling means, for example consisting of a crane, can be sufficient for serving portions of a dock of considerable length in different moments. However, the load handling means requires electric feed supply, both for its own movement and for actuating and controlling pulleys, hoists and the like with which the loads are handled. For this purpose, a solution has been found which envisages the insertion of the power supply cable or cables into trench ducts obtained on the ground; at first, said cables were arranged in open trench ducts, which however involved drawbacks regarding safety and maintenance required for removing the unavoidable accumulations residues therefrom. A solution of this type, moreover, also caused drawbacks and hazards for the passage of service vehicles operating on the dock, so closing the trench ducts became necessary, and was carried out by a plurality of metal ports partly folding by a rostrum, arranged adjacent to each other. The single ports, hinged on a side, opened and closed in progression depending on the need of pulling out the cable from the trench duct and winding it on a special winder, or on the need of introducing it into the trench duct after unwinding from the winder itself. This solution, however, was only suitable for handling means with slow shifting, was very noisy and caused constant needs of maintenance to the hinges of the single ports. A more advanced embodiment, still used, provides for the cover of the trench duct to be obtained by a reinforced tape having elastic features, rather than by the above metal ports; in this way, a sufficient resistance of the tape itself is obtained in order to allow the trafficability of the vehicles on the trench duct, a substantial reduction of noise and the elasticity needed to allow the extraction of the cable for the movement of the handling means at any speed, with concurrent return of the above-mentioned tape to the original position right after such movement.

According to such embodiment, said tape can be longitudinally hinged on a side, or free, that is, only resting on the edge of the trench; especially in the first case drawbacks are noted which relate to both the installation and handling of the tape.

As regards the installation, it is necessary to arrange a large width trench duct on the ground, since also the reinforced tape that screens the opening thereof requires a considerable width sizing; this is because said tape must be fixed by the entire longitudinal extension along an edge of such opening to be temporarily tipped over and allow the exposure of the cable. However, a considerable tape width, generally more than 350 mm, also necessary for ensuring sufficient lifting thereof, corresponds to a limited trafficability and moreover the hinging of the tape itself along an edge of the opening of the trench duct, made with metal straps, riveted metal plates or the like, considerably complicates the installation operations, with consequent remarkable costs. A further drawback that occurs in the operating step relates to the continuous lifting of the tape for exposing the cable arranged in the trench duct. Since such tape is linearly fixed on a side, the lifting thereof causes a partial and constant helix-wise winding, with strong strains and tensions that over time stress the tape itself, thus progressively reducing the flexibility thereof.

A further and important drawback of this known device for the protection of power supply cables lies in the fact that the trench duct screening tape remains imperatively lifted, with potential helix-wise winding, by a high height at the position at which the handling means which has to be electrically powered is; this involves the risk of accumulation of debris in the underlying trench duct and the consequent need of a systematic removal of the same debris in order to prevent the possible cable deterioration.

In the other case the free tape, that is, resting on the trench duct edge, is lifted from the top edge of the trench duct itself by one or more rolls or equivalent means; said rolls are carried by a frame that constantly covers the part of the trench duct or raceway along which the tape is lifted for allowing the exit of the electric feed cable. However, it has been noticed that also this solution exhibits important drawbacks, directly related to the use of the above reinforced tape.

A first drawback relates to the fact that the tape is not kept constant over time as regards the tensioning; localised uncovering or depressions therefore especially occur in considerably long trench ducts which can be harmful to the cable protection, especially due to the inlet of debris into the trench ducts themselves.

A further and related drawback relates to the fact that the tape, even if of the reinforced type, tends to become misaligned relative to the raceway edge, creating possible and harmful sticking during the localised lifting thereof.

A further drawback occurs in relation to the configuration and development of the raceway which, due to the pattern of the ground or to subsequent settling of the same, can be misaligned in vertical direction; also in this case, the cover provided by the tape is often inaccurate in several points or parts of the raceway itself.

A further drawback relates to the fact that, especially due to the above-mentioned misalignments, after lifting the tape re-arranges in an approximate manner along the trench duct edge, further increasing the risk of leaving parts of the trench duct itself uncovered or not suitably covered.

The object of the present invention is to obviate the drawbacks mentioned hereinabove.

More in particular, the object of the present invention is to provide a device for the protection and handling of electric cables suitable for powering mobile use, especially for handling means installed along harbour docks, in order to allow keeping the tensioning of the tape that covers the raceway and that is progressively lifted for allowing the exposure of the electric cable constant over time.

A further object of the invention is to provide a device as defined above wherein said covering tape is kept in constant alignment relative to the raceway, both in horizontal and in vertical direction.

Furthermore, an object of the invention is to provide a device for the protection and handling of electric cables wherein the tape that covers the raceway is repositioned with accuracy along the edge of the raceway itself after the lifting for the passage of the electric cable.

Another object of the invention is to provide a completely closed device, wherein no part of the raceway is open, thus ensuring absolute impossibility of penetration of objects or else in the trench duct, also ensuring the cable safety.

A further object of the invention is to provide the users with a device for the protection and handling of electric cables suitable for ensuring a high level of resistance and reliability over time, such as also to be easily and inexpensively constructed.

These and other objects are achieved by the device for protection and handling of electric feed cables for mobile use of the present invention which comprises a mobile frame, made of metal or other suitable material, provided with a central tower connected to one of said mobile means and with opposite arms, arranged in alignment on a part of a trench duct or raceway buried in the ground with the top open front thereof substantially aligned with the surface level and screened by a flexible tape and which is essentially characterised in that at least one of the opposite arms is provided with means for lifting the tape, arranged at the top and at the bottom of the same, and for guiding and centring the frame in cross direction relative to the raceway.

The construction and functional features of the device for the protection and handling of electric cables of the present invention can be better understood from the following detailed description, wherein reference is made to the annexed drawing tables showing a preferred and non-limiting embodiment thereof with an alternative embodiment and wherein.

Figure 7:
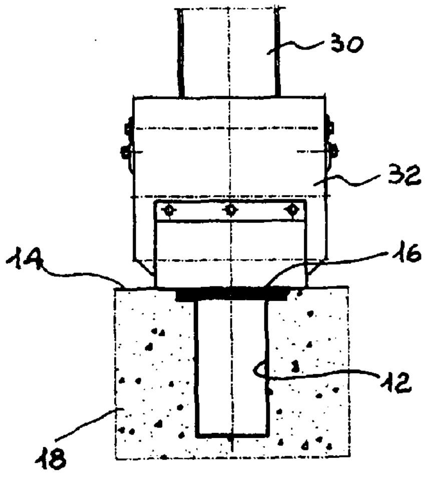
Figure 8:
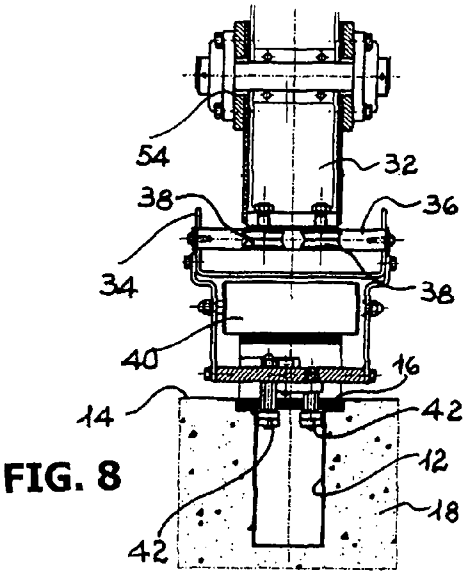
Figure 9:
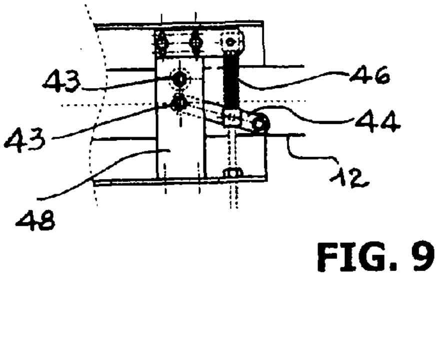
Figure 5:
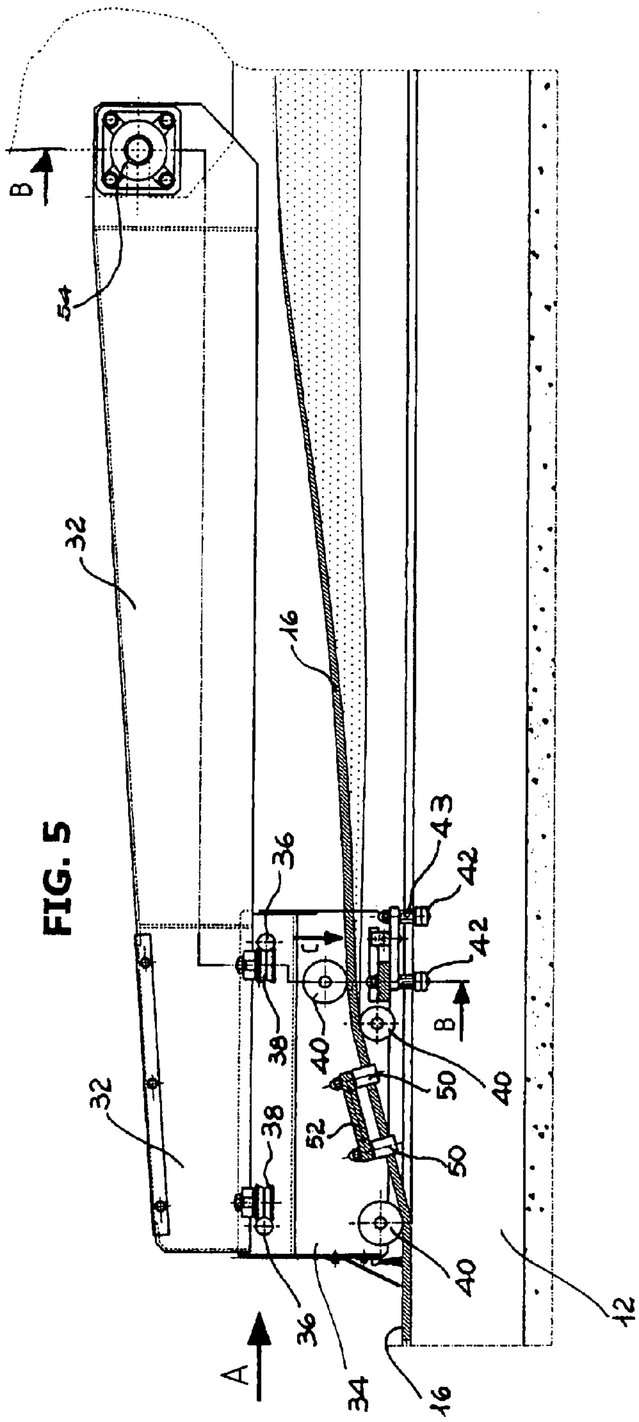
FIG. 5 shows a schematic partial and enlarged view of the device for lifting/repositioning the tape and relative vertical and side guiding system of the same.
Figure 6:
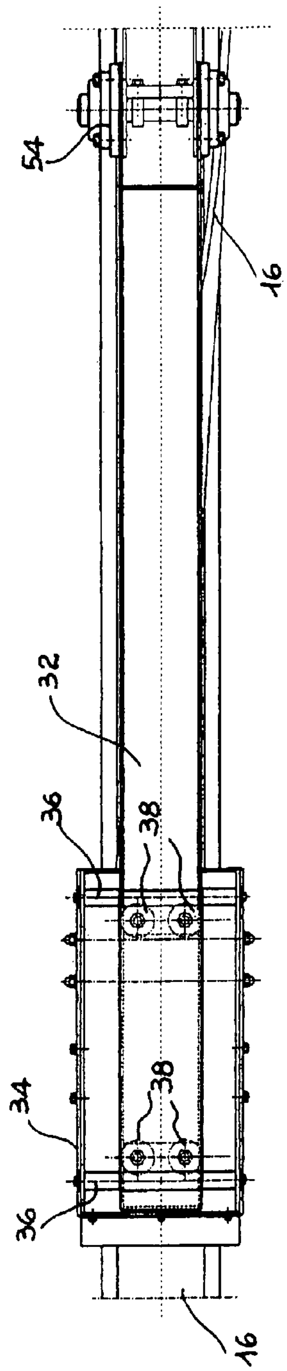
FIG. 6 shows a schematic top view of a part of the same device highlighting the control means in cross direction relative to the raceway wherein the electric cable is arranged.
Figures 10, 11:
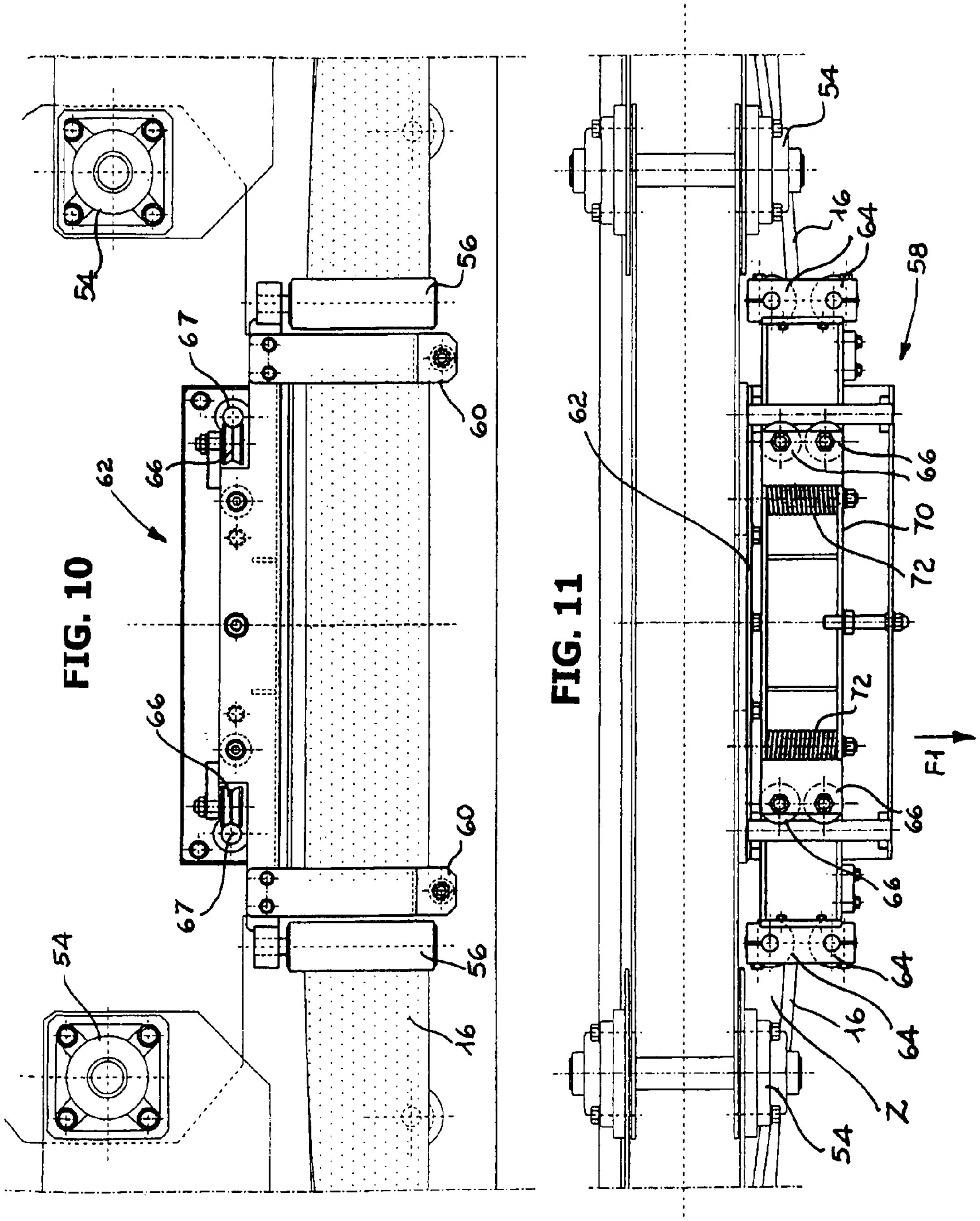

FIG. 7 schematically shows a front view of the device according to arrow "A" of FIG. 5;

FIG. 8 schematically shows a section of the device according to line B-B of FIG. 5;

FIG. 9 shows a partial enlargement of the device according to arrow "C" of FIG. 5;

FIGS. 10 and 11 show as many schematic views of the guiding and tensioning means, arranged centrally on the device, of the tape that covers the raceway wherein the electric cable is arranged;

FIG. 12 shows a schematic side view of the means for tensioning the ends of said tape that covers the raceway;

FIG. 13 shows a view according to arrow "A" of FIG. 12 that shows said means for tensioning the ends of the tape;

The FIGS. from 14 to 18 relate to an alternative embodiment of the device for the protection and handling of electric cables of the present invention.

Figure 1:
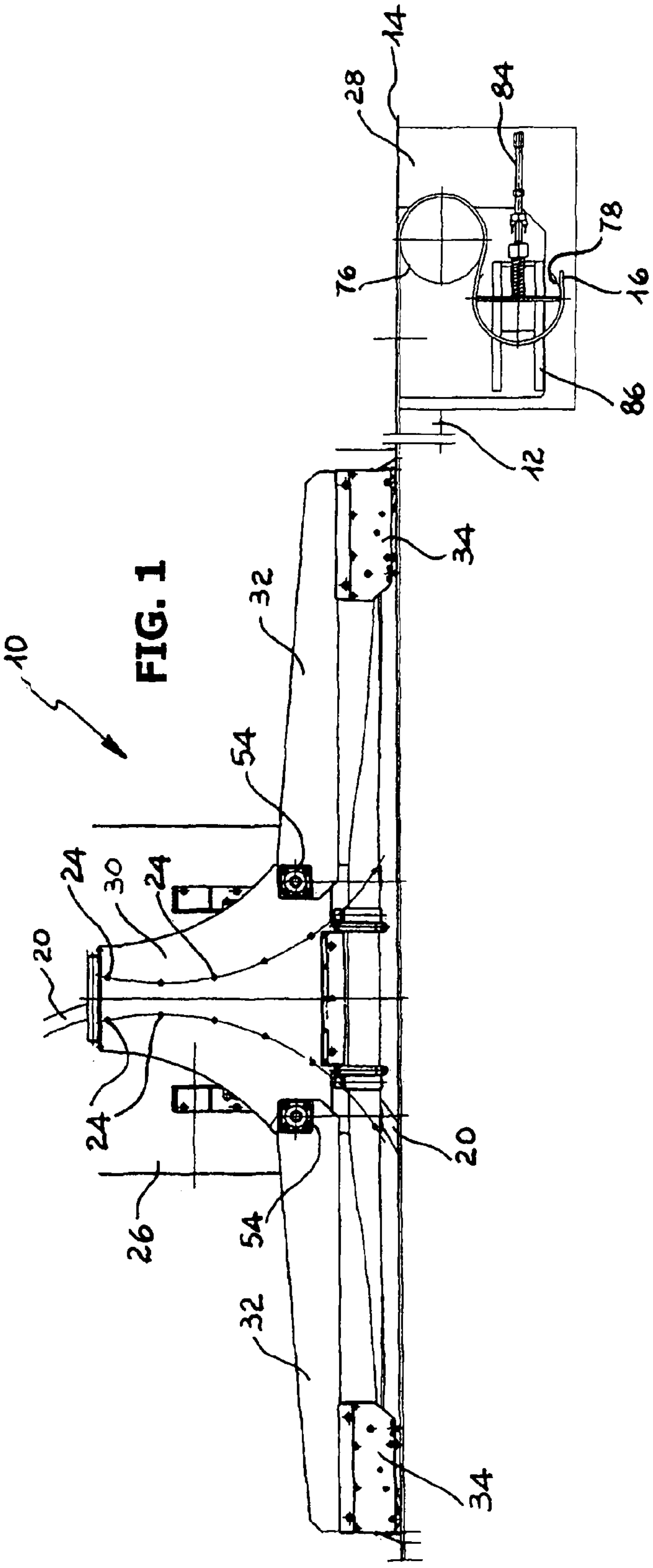
FIG. 1 shows a schematic side view of the device of the present invention.
Figure 3:
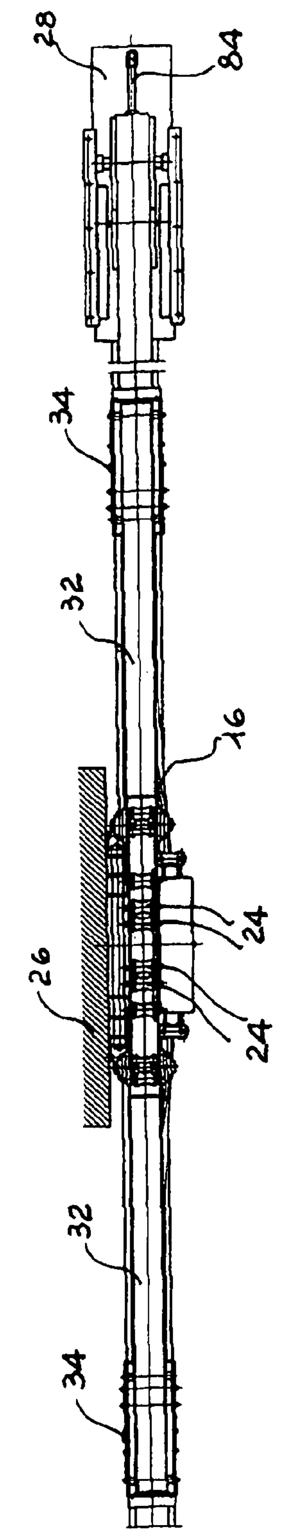
FIG. 3 shows a schematic top view of the same device.
Figure 2:
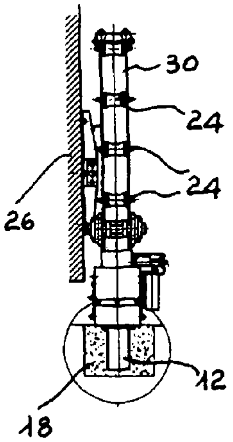
FIG. 2 shows a schematic front view of the same device.
Figure 4:
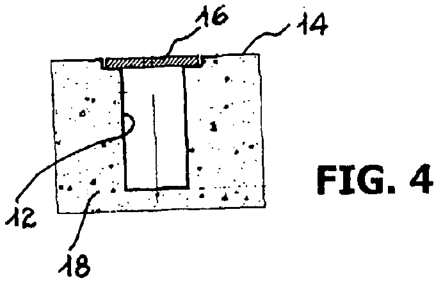
FIG. 4 shows an enlarged detail of FIG. 2.

With initial reference to FIGS. 1 to 4, the device for the protection and handling of electric feed cables for mobile use of the present invention comprises a mobile frame made of metal and/or other suitable material, globally indicated with 10 and arranged in alignment along a part of a buried trench duct or raceway 12, whose top open front is substantially aligned with the surface level 14 and is screened by a flexible rubber tape 16, with optional metal and/or textile reinforcements. An electric cable, schematised with 20 at FIG. 1, is arranged in the buried raceway 12, which is advantageously buried in a concrete casting 18 or the like, which winds and unwinds from a central support or tower 30 of known type provided with a plurality of idle rollers 24 that convey the cable itself on a pick up drum (not shown). Support 30 of frame 10, thereby the frame itself, is connected in a known manner to a mobile means for picking up and handling loads, such as a crane (not shown) sliding on tracks fixed on the surface 14 and extending along a dock of a harbour; said mobile means, which is powered by the electric cable 20, is partly schematised with 26 at FIGS. 2 and 3.

The trench duct or raceway 12, preferably made of metal such as steel or galvanised sheet, extends in the ground by a length equal or higher than the one of the travel way of the mobile means 26; its opening is aligned with the surface level 14, or slightly lowered relative to the surface itself in order to compensate the thickness of the tape 16 and making the latter be substantially aligned and coplanar, or, at most, lower than the above-mentioned surface level 14. Since the extension of the harbour dock can reach several hundreds of meters and as a consequence, also the raceway 12 is sized accordingly, the tape 16 that screens the opening of the raceway itself can consist of two or more segments jointed to one another by curing or connected to one another by metal or other type of joints with exemplifying sandwich-wise constraint; in the case of limited extension of the raceway, said tape 16 is made in a single piece. In all cases, the tape 16 needs to be suitably tensioned, both at the beginning and at subsequent times for recovering or compensating the unavoidable loosening that occurs both for the mechanical stresses to which the tape is subject to and by the effect of expansions caused by the weather/environmental conditions; specific devices are provided for achieving such adjustments which will be described hereinafter, placed in a buried space 28 forming the extension of the raceway 12 at least at an end of the same.

The mobile frame 10 comprises the central tower 30, for example with irregular prismatic shape, provided with opposite articulated arms 32 which develop from each of the sides of the tower itself and surmount part of the raceway or trench duct 12, from which they are spaced by a limited part. Said arms 32 have a width equal to or larger than that of the raceway 12 and longitudinal extension that in any case can be variable, but indicatively comprised between 1500 and 3000 mm.

The free ends of the articulated arms 32 are provided with integral means suitable for allowing the temporary lifting of the tape 16 from the edge of the raceway 12 and the subsequent precise repositioning thereof, in order to allow the extraction of the cable 20 depending on the mobile point 26. Said means integral to the articulated arms 32 consist in a head 34, composed of a metal frame substantially shaped as an upturned "U" that supports a pair of spaced rolls or bars 36, extending transversally relative to the raceway 12. The rolls or bars 36 make as many linear guides that cooperate with as many grooved rolls 38, attached by known means to the bottom front of each arm 32. Also the metal frame that carries the rolls 36 is constrained in known manner to the arms 32. As a consequence each head 34 is capable of free stroke in cross direction and is therefore independent as regards parallelism relative to the raceway 12; it is therefore possible to compensate any horizontal misalignment of the raceway itself relative to the mobile frame 10 during the movement of the tape 16.

The head 34 is further provided with two or more rolls 40, transversally extending and with idle rotation, for lifting the tape 16 of the edge from the raceway 12; the same head 34, moreover, advantageously comprises further means for centring and maintaining the alignment relative to the raceway 12, in order to prevent possible sticking during the movement of the tape in the event of localised deformations of the rectilinear development of the raceway itself. The rolls 40 are arranged in such a way that at least one of them is arranged below and at least one of them is arranged above the tape 16. Said further centring means consist of one or more pairs of rolls or bearings 42, whose rolling surface is parallel to the vertical walls of the raceway 12; the rolls or bearings 42, in case made of rubber, are carried by respective stems 43, at least one of which is connected to an arm 44 elastically tensioned by a helical spring 46 or the like. The stems 43 and the arm 44 are connected by known means to a plate-shaped cross support 48 associated to each head 34. During the stroke of the mobile frame 10, the rolls or bearings 42 constantly abut on the opposite vertical walls of the raceway 12 and compensate any deformations thereof as regards the rectilinearity, thus obtaining the correct movement of the tape 16, both in the lifting step and in the subsequent step of repositioning along the edge of the raceway itself.

According to a preferred embodiment, also the tape 16 is provided with specific guiding means, in particular for centring relative to the raceway 12, consisting of pairs of wheels 50 or the like, carried by plates 52 attached to the inner front of one or both the arms 32 or to the respective head 34; the wheels 50 are arranged so as to abut on the opposite edges of the tape 16 and keep it aligned to the opening of the raceway 12.

The opposite arms 32 of the mobile frame 10 are articulated through conventional articulations 54 at the opposite sides of the tower 30, so as to compensate in case, in an automated and continuous manner, the vertical misalignment of the raceway 12.

The plurality of rolls 40 mentioned above has the function at first of lifting the tape 16 by a limited height relative to the raceway 12, in order to allow the temporary extraction of the electric cable 20 depending on the stroke of the mobile means 26; in output from the raceway 12, the electric cable 20 winds on the drum arranged on the mobile frame 10, whereas in the opposite step it unwinds from the above drum to return inside the raceway itself, by the effect and under the guide of the rolls 40 and of the pair of wheels 50. Since only lifting the tape 16 leads to frictions with the cable 20, the solution of temporarily bending the tape itself is known, orientating it in vertical direction relative to the original position thereof, which is typically made with idle guiding rolls 56, arranged and attached to the central part of the mobile frame 10. However, this known solution does not allow keeping the tape 16 constantly in vertical position along the various parts thereof oriented in such direction; since the tape guiding and orientation members are limited to the above rolls 56, the tape itself is easily subject to bends that especially concern the top edge thereof and that, as a consequence, sometimes lead to sticking and uncontrolled oscillations of said tape 16. According to a further advantageous feature of the invention, the frame 10 is therefore provided with one or more devices for tensioning and guiding the tape 16 in vertical; one of such devices is globally schematised with 58 at FIG. 11 and, besides the conventional rolls 56 mentioned above, it comprises one or more sliding supports 60 of the lower edge of the tape 16 already arranged vertically and an elastic tensioning device 62 cooperating with pairs of rolls 64, 66 between which the tape 16, vertically oriented, is led to slide. The tensioning devices 62 is fixed in known manner to the tower 30, for example by one or more screws 68 for limiting the sliding stroke or the like and comprises a frame 70 that supports part of the above-mentioned rolls, for example the rolls 66 associated to linear guides 67 or other similar sliding system, and one or more helical springs 72 which determine the shifting thereof by constant elastic thrust, so as to systematically tension the tape 16 in radial direction, that is, in the direction indicated by arrow the "F1" at FIG. 11. In this way, besides being precisely guided and kept in vertical orientation by the rolls 64 and 66, a part of which are grooved and similar to the rolls 38 above-mentioned, the tape 16 remains constantly tensioned along the entire surface thanks to the tensioning device(s) 62, avoiding sticking and inaccuracies in the overall handling. Such system also serves for recovering any local elongations of the tape itself.

As mentioned above, the tape 16 needs to be constantly and evenly tensioned also in longitudinal direction, in order to prevent or compensate loosening that would create problems in the handling of the mobile frame 10 and moreover, could damage the tape itself. For this purpose, according to a further advantageous feature of the present invention, the trench duct or raceway 12 extends, at least at one of the opposite ends, and leads without interruption in the above buried space 28, schematised in particular at FIG. 12 which also shows the tensioning means of the tape 16 arranged therein. The space 28, which is preferably obtained at both the ends of the trench duct or raceway 12, exhibits larger depth than the raceway itself with which it communicates and receives a device 74 suitable for the automatic tensioning of the tape 16. Said device 70 comprises a pulley 76, with free rotation, whose side surface is substantially aligned to the top edge of the raceway 12 for receiving the tape 16 which partially winds thereon and is returned to an underlying half-pulley 78 slightly retracted and not rotating; the half-pulley 78 defines a semi-cylindrical body provided with a diaphragm or a diametrically extended crosspiece 80 on which an elastic member 82 acts, typically a helical spring, carried by a threaded tie rod 84 attached by known means to a wall of the space 28.

The half-pulley 78 is capable of sliding in the direction indicated by the arrow "F2", that is, in the direction facing the tower 30 of the mobile frame 10, as it is connected to guides 86 cooperating with shoulders 88 extended and stabilised in the space 28.

The tape 16, returned on the pulley 76 is partially wound, in particular with the end part thereof, also on the half-pulley 78 at the surface of which it is fixed with plates and bolts 90 or the like. The initial tensioning of the tape 16, which is carried out with the tie rod 84 upon the installation of the device as a whole, is followed by the automatic recovery of any loosening thanks to the spring 82 that is suitably pre-loaded and pushes the half-pulley 78 in the direction of the arrow F2. The tape 16, as a consequence, remains constantly tensioned in the predetermined manner; any increases or decreases of the tensioning can in any case be obtained in an easy and quick manner, operating the tie rod(s) 84.

During the installation of the device of the present invention, the mobile frame 10 is arranged on the raceway 12, with the tower 30 fixed to the mobile means 26 and with the tape 16 arranged between the rolls 40 of the heads 34 of each articulated arm 32 of the frame itself. The tape 16 is substantially bent at 90°, to be oriented vertically, in its part centrally arranged in the mobile frame 10, that is, in the practice, in the zone corresponding and/or close to the tower 30; this is in order to arrange said part of the tape 16 between the pairs of rolls 64 of the tensioning device(s) 58, as schematised in particular at FIGS. 10 and 11. Following these operations for installing and positioning the tape 16 relative to the mobile frame 10, the tape itself is suitably tensioned by the device(s) 74 arranged in the space(s) 28; clearly said tape is temporarily fixed, at the opposite ends, to each of the half-pulleys 78 or to other suitable support in case, on one head, the tensioning device 74 is absent.

FIG. 11, in particular, shows that the tape 16 is bent vertically in the zone of the tower 30 and therefore leaves a wide zone "Z" suitably temporarily uncovered for the trouble-free exit of the cable 20 from the raceway 12 and on the contrary, for the repositioning thereof in the raceway itself. Anyway said tape is guided in an accurate and constant manner, away from sticking or phenomena that could in any case make the motion of the mobile frame 10 difficult, thanks to the plurality of guiding devices present on the heads 34 or associated to the tape itself; the means carried by the heads 34, and by way of an example referred to the grooved rolls 38 and to the rolls or bearings 42, operate in relation to the raceway 12 for keeping the precise alignment of the arms 32 relative thereto and for obtaining any dimensional compensations in the horizontal direction. The wheels 50 of the plates 52 on the other hand have the function of aligning the edges of the tape 16 with the opening of the raceway 12, whereas the articulations 54 allow the arms 32 to compensate any differences in level in the vertical direction of the raceway itself. Not only the lifting and handling of the tape 16 are carried out in a constantly precise manner, also in the parts each time oriented vertically, but also the repositioning of said tape takes place according to compulsory methods, which exclude the risks of an approximate or out-of-line arrangement thereof relative to the raceway 12.

FIGS. 14 to 18 relate to another embodiment of the device of the present invention. In said figures, the same reference numerals of the previous solution followed by an apex are used for the common parts or components.

Figure 14:
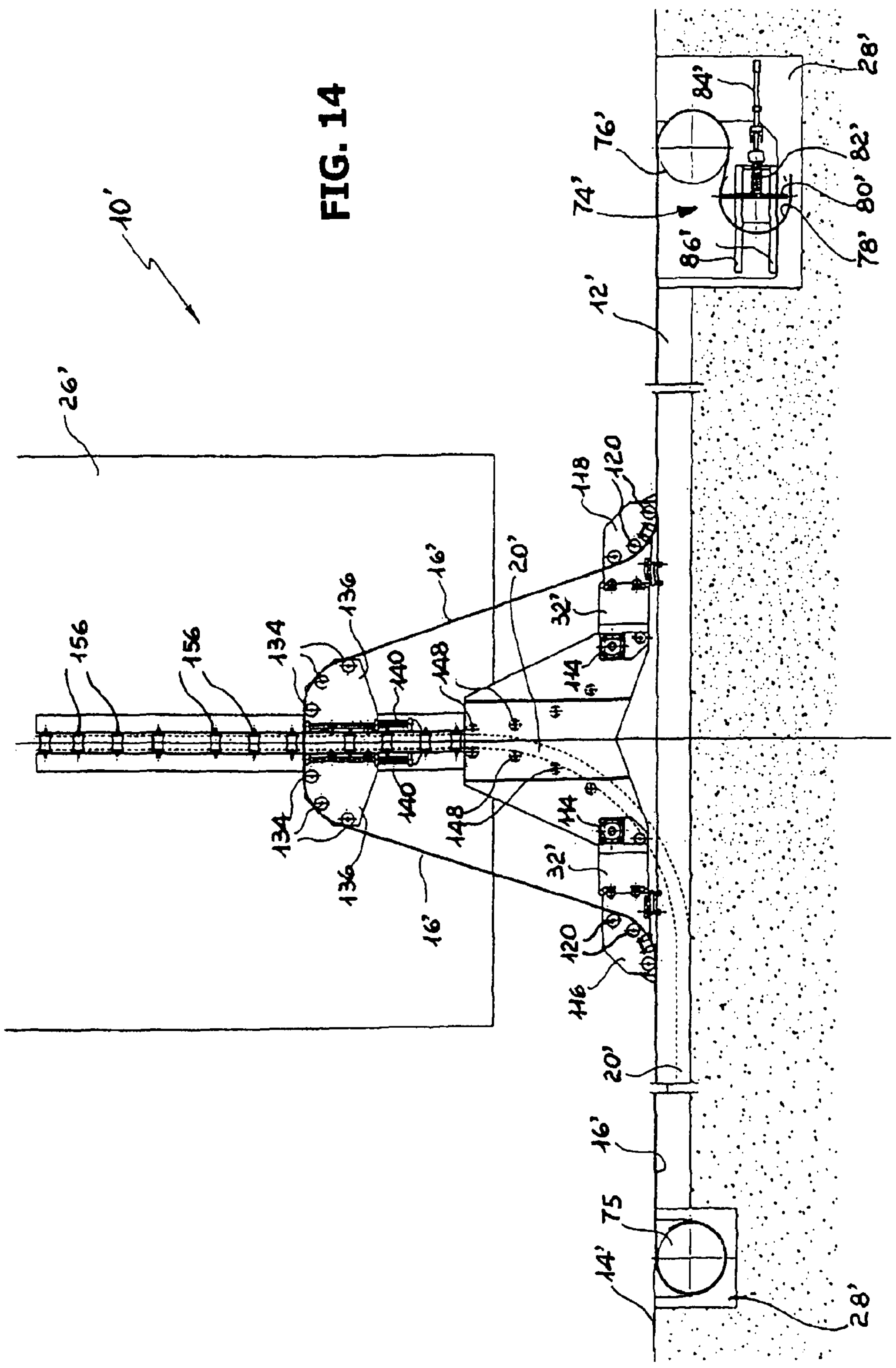
Figure 15:
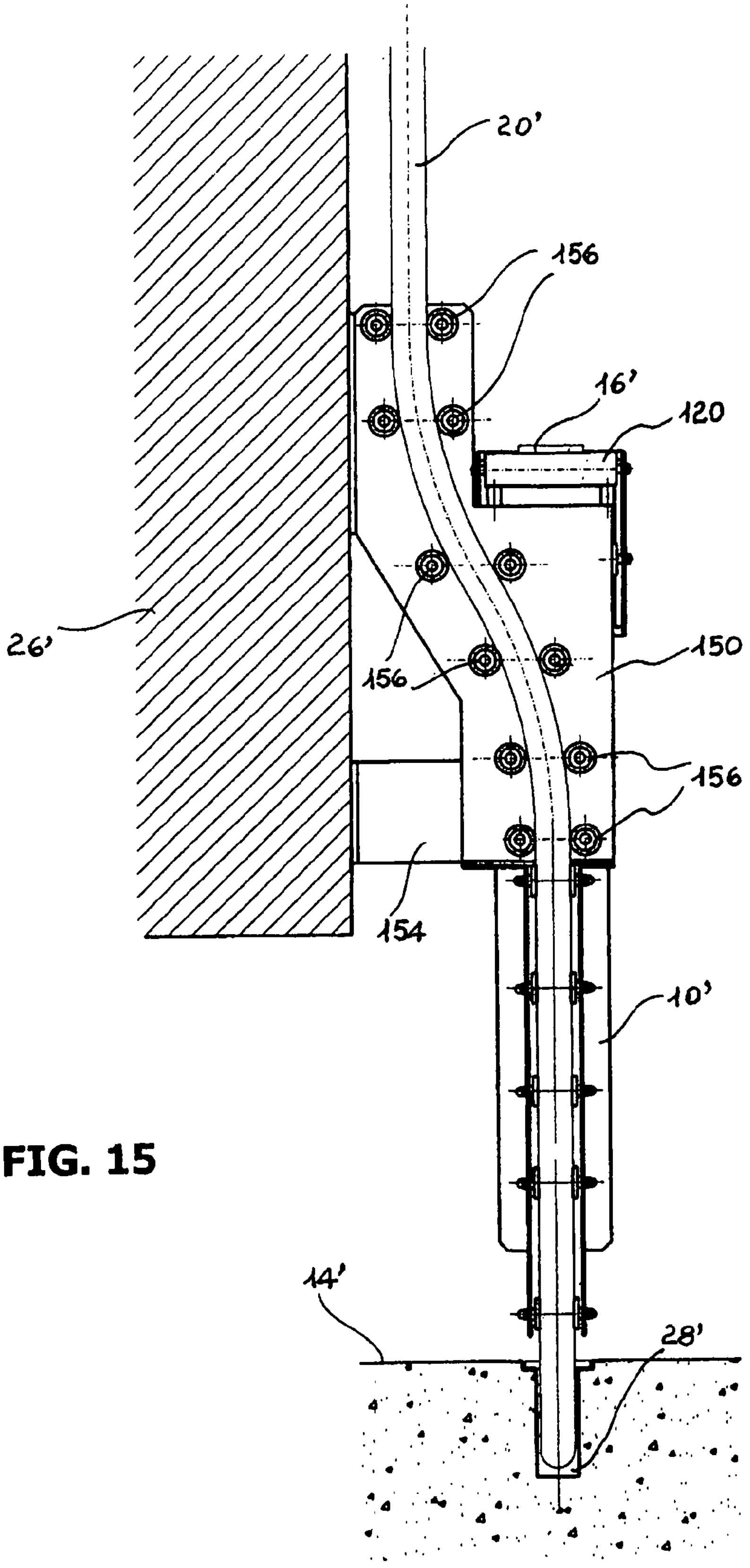
Figure 16:
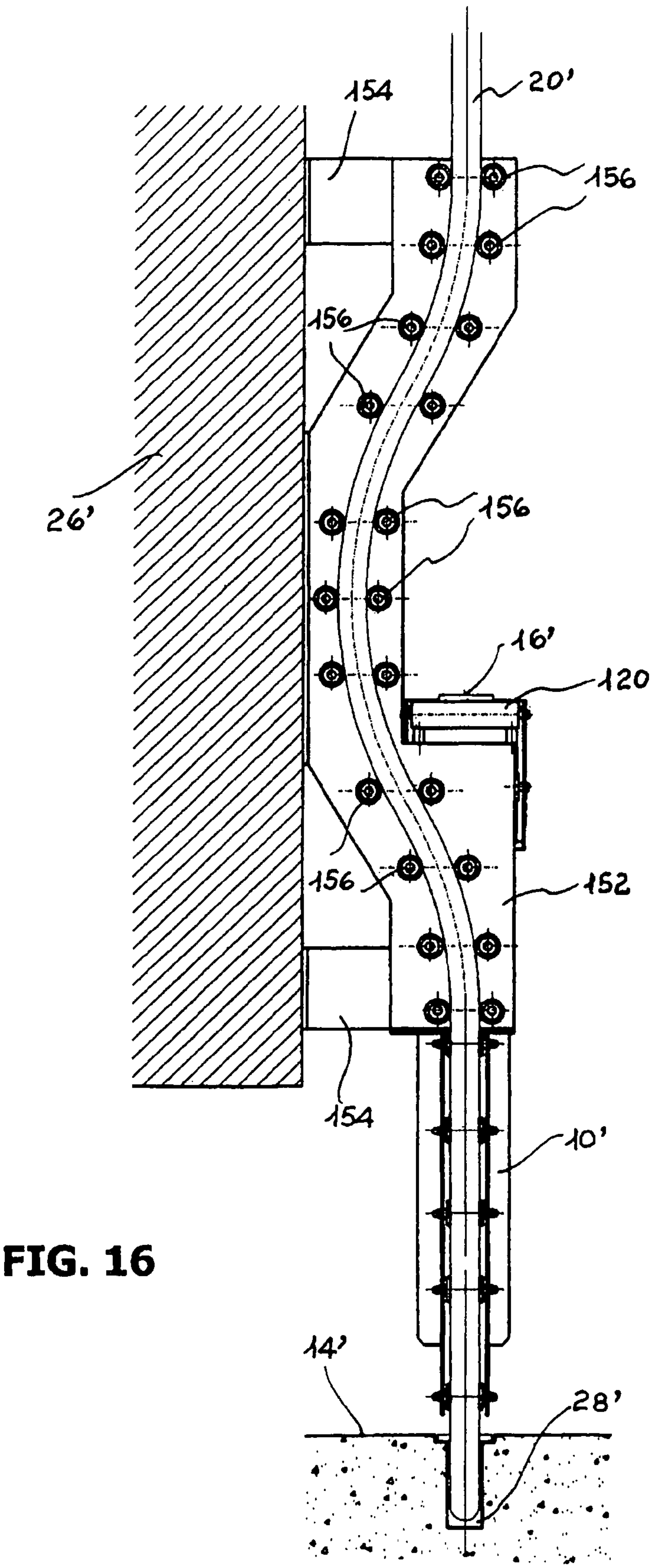
Figure 17:
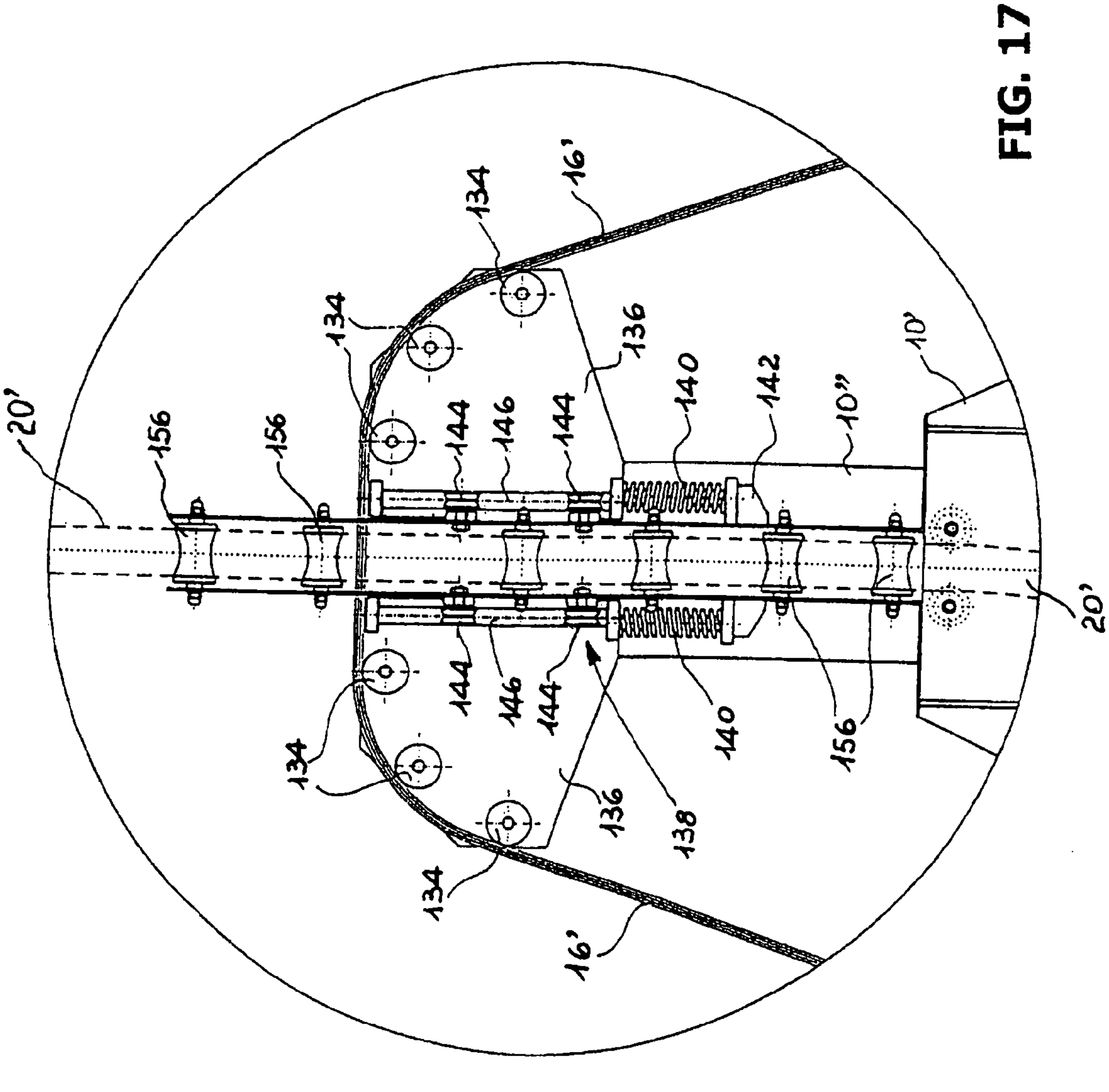

According to this embodiment, the device for the protection and handling of electric cables of the present invention comprises, as in the solution described above, a mobile frame globally indicated with 10' at FIG. 14, suitable for being slidingly moved along a rectilinear path defined by adjacent tracks or travel ways (not shown) for example arranged along the surface level 14' of a harbour dock. Said mobile frame, made of metal or other suitable material, has preferably a tower development 30', centrally hollow, and an overall configuration of irregular prismatic type; the same frame is arranged at and above a buried trench duct 12', which extends in rectilinear direction along said surface level 14' and receives an electric cable 20' intended for powering a mobile means such as a crane or a bridge crane. Said mobile means, to which the mobile frame 10' is fixed by known means, is partially schematised with 26' at FIGS. 14, 15 and 16 and is provided with wheels or the like that allow its sliding along said tracks or travel ways. The opening or top exposed front of the trench duct 12', substantially aligned with the surface level 14', is typically screened by a flexible tape 16', made of rubber or elastomeric material in case reinforced, which extends along the entire trench duct 12' with development in a single piece or in multiple parts jointed to one another according to the length of the trench duct itself; the tape 16' is fixed to a pulley or the like at the opposite ends of the above-mentioned trench duct 12'. Advantageously, as described in detail hereinafter, at least one of the opposite ends of the trench duct 12' the tape 16' is fixed to a device that allows its suitable tensioning, with substantially automatic procedure, in order to compensate the yields or loosening that occur by settling or by the effect of environmental conditions related to temperature.

According to this embodiment of the invention, the mobile frame 10' comprises adjustable guiding means suitable for displacing and orientating in a precise manner the tape 16', to make it follow such a path so as to go beyond the frame itself without being subject to twisting or winding, even if partial, on itself.

Opposite arms 32' horizontally develop from the base of the mobile frame 10' pivoted with generic articulations 114 on the frame itself and associated to respective heads 116, 118 which make the extension thereof and carry a plurality of continuous guiding and centring means of the tape 16'. The arms 32' and the respective heads 116, 118 are aligned in longitudinal direction to the trench duct or raceway 12' and partially surmount the tape 16' that is led to bend upwards, as explained in detail hereinafter. Such bend, which orientates the tape 16' to progressively address upwards for reaching the top of the frame 10' and go beyond it and for repositioning and screening the trench duct 12', is determined by a plurality of rolls 120 with idle rotation, developed along a curvilinear path and fixed in known manner to the heads 116, 118. The heads 116 and 118 are advantageously formed by a metal frame shaped as an upturned "U" and are respectively arranged at the free end of the arms 32'.

Figure 18:
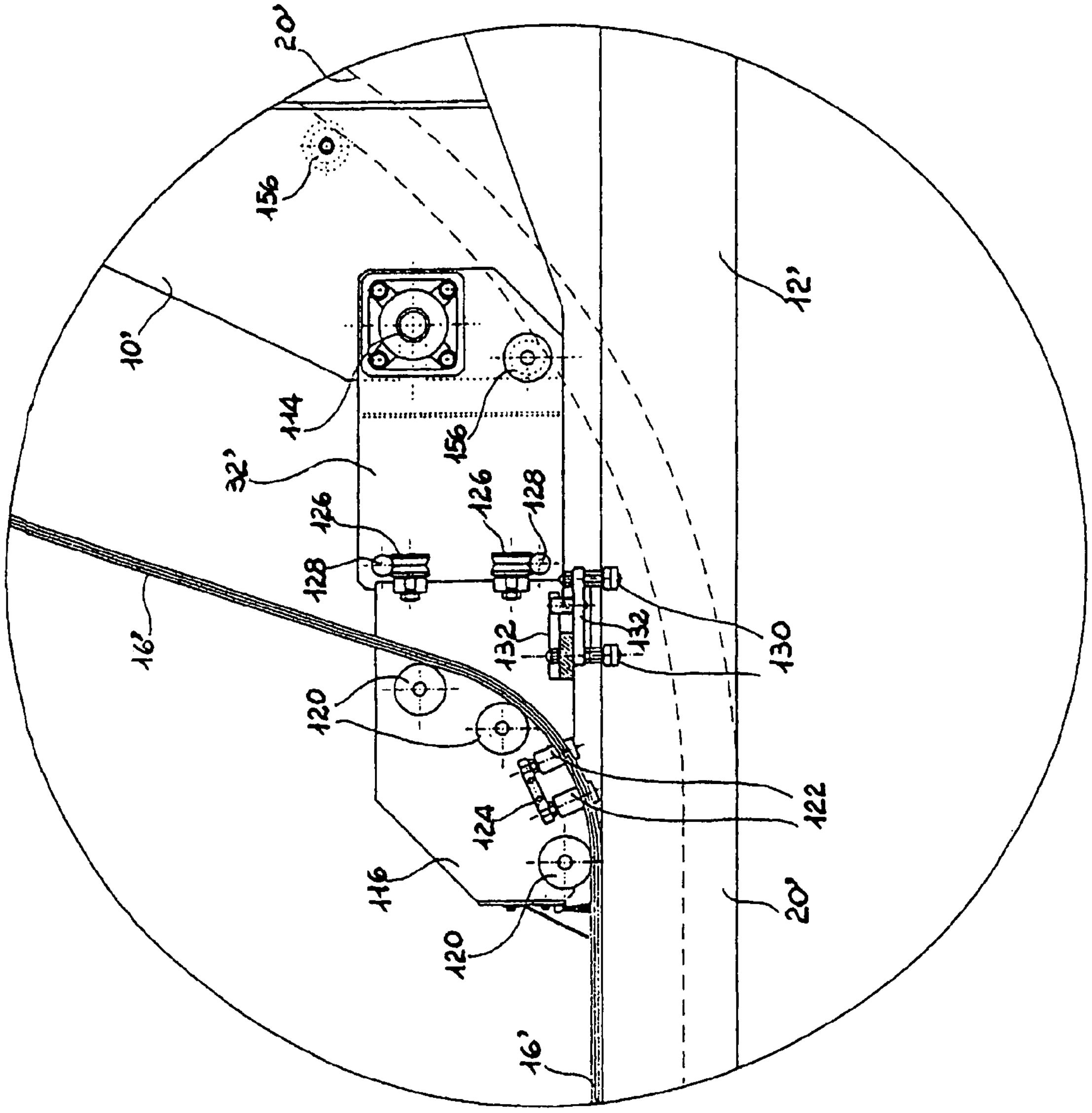

In the example detailed in particular at FIG. 18, there are three rolls 120 of the same diameter, and one of them surmounts the tape 16' which is still substantially positioned on the trench duct 12'; it is also to be provided for said rolls to be present in a number different from what approximately illustrated and in case to exhibit a diameter differing from each other.

Special centring means of the tape 16' relative to the raceway or trench duct 12' are arranged between the above rolls 120, on each head 116, 118; said means that maintain the suitable alignment of the tape 16' also when it is lifted and oriented upwards relative to the trench duct 12', preferably consist of pairs of wheels 122 or the like, supported by plates 124 in turn made integral in a known manner to the inner front of the heads 116, 118. The wheels 122 abut on the opposite edges of the tape 16', prevent strokes in cross direction beyond a minimum height thereof, and as a consequence, always keep it aligned or facing the opening of the trench duct or raceway 12'. Since the need of keeping the tape 16' in constant alignment with said raceway is essential for the purpose of a proper operation of the device comprising the mobile frame 10', also considering the fact that said tape 16' is led to go beyond the frame itself and that therefore considerably departs from the raceway 12', further alignment and control devices are advantageously provided, as detailed hereinafter. The heads 116, 118, in the first place, are made transversally moving or oscillating relative to the respective arms 32' through rolls 126 sliding along one or more stems 128 arranged transversally along said arms; the rolls 126, whose rolling surface is advantageously grooved for conjugating with the stems 128, are fixed in a known manner to the heads 116, 118 from which they protrude in the direction of the same arms 32'. In addition to this possibility of cross stroke of the heads 116, 118 it is preferably provided for the same to comprise one or more wheels 130 carried by plates 132, similar to wheels 122 and to plates 124 described above; the wheels 130 have the function of controlled and constant centring of the tape 16', abutting on the opposite inner edges of the raceway 12'.

Members for the guiding, centring and directional return of the tape 16' in the step of going beyond the frame itself are also arranged in the top part of the mobile frame 10', besides a device for its constant tensioning. Said members for the guiding, centring and directional return of the tape 16' for example consist of one or more rolls or pulleys 134 with idle rotation, carried by a support frame consisting of paired plate-shaped elements or, preferably, by two associated frames 136, obtained in the same manner with two plates opposite to one another and suitably spaced according to the width of the tape 16'. The frames 136 are radiused at least in the central-top part for orientating the above-mentioned tape in overtaking according to a path defined by a wide radiusing on both the rising and lowering sides. In a particularly advantageous manner, the frames 136 are associated to a tensioning device globally indicated with 138 at FIG. 17, fixed to the mobile frame 10' or to an extension thereof 10" and with the effect of upward thrust. Said tensioning device 138 comprises, according to a preferred and non-limiting embodiment, one or more pairs of elastic means, typically helical springs 140, fitted on conventional stems or the like (not shown) which develop from a base 142 and abut on the frames 136 at the top end thereof; the latter are associated to rolls, bearings or the like 144, sliding according to a vertical direction along guides 146 formed by circular section bars or the like.

The tensioning of said device and its action on the tape 16' is determined by the preload of the springs 140, suitably calibrated, which automatically recover with their temporary and partial extension any loosening of the same tape 16'.

The electric cable 20', placed in the trench duct or raceway 12', exits in a known manner from the trench duct itself with an end along the bottom central zone of the mobile frame 10', for winding according to a path oriented by rolls 148, on a conventional drum (not shown) belonging to the mobile means 26', or for unwinding, inversely, from the drum itself and repositioning inside said trench duct. According to a further advantageous feature of the invention, the mobile frame 10' comprises a shaped conveyor 150 or 152, respectively shown in FIGS. 15 and 16, which constantly guide the cable 20' and suitably move it away from the trench duct 12' during the extraction from the same. For this purpose, at least one spacer 154, of any shape and/or development, is interposed between said mobile means 26' and the conveyors 150 or 152 that are arranged on the side of the mobile frame 10' facing the means itself. The conveyors 150 or 152, which respectively define a single curve and a double curve and incorporate pairs of the above-mentioned rolls 148 for guiding the electric cable 20', are advantageously used on new or existing installations for defining or compensating the nominal length of the electric cable 20' and preventing the cable itself from slipping along the edge of the tape 16' when it is pulled out of the trench duct 12' or is rearranged therein.

Further pairs of rolls 156 are arranged and fixed in a known manner in the mobile frame 10' for guiding the electric cable 20', at least along the conveyors 150 and 152, in the step of extraction from the trench duct 12' or in the repositioning into the same.

In order to keep the tape 16' suitably tensioned at the opposite ends, irrespective of the effect of pressure of the tensioning device 138 with springs 140, according to a further advantageous feature of the invention it is provided for at least one free end of the tape itself to be associated to specific tensioning means. For this purpose, the trench duct or raceway 12' communicates with a buried space 28' wherein a device 74' is placed, suitable for the substantially automatic tensioning of the tape 16'. The tensioning device 74' comprises, according to an exemplifying and non critical embodiment, a pulley 76' with free rotation, to part of the side surface aligned with the top edge of the raceway 12' for receiving said tape 16' which partially winds thereon and is returned to an underlying half-pulley 78', not rotating but associated to means that allow the shifting or linear stroke thereof in the direction of the mobile frame 10'. The half-pulley 78' consists in a substantially semi-cylindrical support, provided with a diametrically extended crosspiece 80' on which a helical spring 82' or the like acts in thrust. The spring 82' is associated to a threaded tie rod 84', fixed in known manner to one or more walls of the buried space 28'.

The half-pulley 78' can slide in the direction of the mobile frame 10' since it is connected to linear guides 86' fixed in the above space 28'. The tape 16' is returned by the pulley 76' to the half-pulley 78' according to a substantially "S" shaped path and is therefore constrained to said half-pulley with its free end by plates and screws or similar retain and stabilisation members. The initial tensioning of the tape 16 is carried out with the threaded tie rod 84' upon the installation of the device as a whole; after that, the automatic recovery of any loosening of the tape 16' takes place by the effect of the spring 82' that is suitably pre-loaded and pushes the half-pulley 78' along the guides 86' in the direction of the mobile frame 10'. The tape 16', as a consequence, remains constantly tensioned in the most suitable manner but any adjustment can in any case be made in an easy and quick manner, manually operating the threaded tie rod 84'.

It is possible to envisage the installation, along a same trench duct 12', of two or more associated and aligned pieces of device according to the invention, autonomously fed and moved in opposite directions; a situation of this type can be advantageous if the dock length, and thereby the one of the trench duct 12', is particularly high, so that each device covers a part of the path defined by said trench duct.

If said device 10' is installed upon the realization of the system, the flexible tape 16' is arranged with such extension as to go beyond the device itself to be fixed to the opposite ends according to the descriptions made.

On the other hand, if an installation originally envisages a single device along a trench duct 12' and then there is the need or the opportunity of associating a second one or more, the flexible tape 16' is not sufficiently long and must therefore be replaced, with considerable costs, even if it is still in excellent condition.

To prevent this drawback it is therefore preferably provided for this flexible tape to be already originally sized to go beyond two or more pieces of device as needed, even if only one is provided at first. The amount or stock of flexible tape 16' is arranged in the buried space 28', wherein it drops freely after it has been wound on the half-pulley 78'; as an alternative or in addition, part of said tape can be arranged according to two or more windings on the pulley arranged in the buried space opposite the previous one, typically without tensioning means with automatic recovery and indicated with 75 at FIG. 14.

Even if the invention has been described hereinbefore with particular reference to an embodiment thereof made by way of a non-limiting example only, several changes and variations will appear clearly to a man skilled in the art in the light of the above description. The present invention therefore is intended to include any changes and variations thereof falling within the spirit and the scope of protection of the following claims.

The invention claimed is:

1. A device for protection and handling of electric feed cables (20-20') for mobile use, for a mobile device (26-26') for lifting and moving loads installed along harbour docks, comprising a mobile frame (10-10'), provided with a central tower (30-30') connected to said mobile device and having opposite arms (32-32'), arranged in alignment on a part of a trench duct or raceway (12-12') buried in the ground having an open top substantially aligned with a surface level (14-14')

and screened by a flexible tape (16-16'), wherein at least one of the opposite arms (32-32') is provided with means for lifting the flexible tape (16-16'), arranged at a top and/or bottom of the flexible tape, and means for guiding and centering the mobile frame (10-10') in cross direction relative to the raceway (12-12').

2. The device according to claim 1, wherein two or more idle rotation rolls (40-120), extending transversally and constrained to a head (34, 116-118), lift the flexible tape (16-16'), and one or more pairs of spaced bars (36-126), extending transversally relative to said raceway (12-12') and forming as many linear guides for two or more grooved rolls (38-128) fixed to the bottom front of the arms (32-32') and/or of the head (34-116-118) guide and center the mobile frame (10-10') in cross direction relative to the raceway (12-12').

3. The device according claim 2, wherein the head (34-116-118) consists of a metal frame substantially shaped as an upturned "U" and is arranged at the free end of each arm (32-32') and, relative to at least one of them, it comprises one or more pairs of rolls or bearings (42-122) whose rolling surface is parallel to the vertical walls of the raceway (12-12') for centering and keeping the alignment of the arms themselves relative to the raceway (12-12').

4. The device according claim 3, wherein the rolls (42) are carried by respective stems (43) at least one of which is connected to an arm (44) tensioned by a helical spring (46) and connected to a plate-shaped support (48) extending transversally in one or both heads (34).

5. The device according to claim 1, wherein the arms (32) of the frame (10) are articulated on the central tower (30) which is provided with at least one device (58) for tensioning and guiding the tape (16) vertically, comprising one or more sliding supports (60) of the lower edge of the tape itself and at least one elastic tensioning device (62) cooperating with pairs of rolls (60-66) between which said tape (16) arranged vertically slides.

6. The device according to claim 5, wherein said at least one elastic tensioning device (62) is fixed to the tower (30) with one or more screws (68) limiting the sliding stroke and comprising a frame (70) that supports said rolls (66) which are associated to linear guides (67), as well as one or more helical springs (72) that tension the tape (16) with thrust in radial direction.

7. The device according to claim 1, which comprises one or more devices (74-74') for tensioning the tape (16-16') in longitudinal direction.

8. The device according claim 7, wherein a tensioning device (74-74') is arranged in a buried space (28-28') communicating with at least one end of the raceway (12-12') and comprises a free rotation pulley (76-76') cooperating with a half-pulley (78-78') slightly retracted and not rotating on the surface whereof an end of the tape (16-16') is fixed, the half-pulley (78-78') being tensioned along a diametrical crosspiece (80-80') by one or more helical springs (82-82') carried by as many threaded tie rods (84-84') fixed to a wall of said space (28-28').

9. The device according to claim 8, wherein the halfpulley (78) is connected to guides and shoulders (86-88) for the sliding thereof in the direction of the tower (30) under the thrust of the springs (82).

10. The device according to claim 1, wherein pairs of wheels (50-130) carried by one or more plates (52-132) fixed to the inner front of one or both arms (32-32') and/or to the respective head (34-116-118) center the tape (16-16') relative to the raceway (12-12').

11. The device according to claim 1, wherein the flexible tape (16') reaches and goes beyond the top of the mobile frame (10') at which it is guided and returned by one or more rolls or pulleys (134) with idle rotation carried by one or more frames (136).

12. The device according to claim 11, wherein said frames (136) are associated to a tensioning device (138) comprising one or more pairs of helical springs (140) which develop from a base (142) and abut, at the opposite end, on the said frames.

13. The device according to claim 12, wherein the frames (136) cooperate with rolls or bearings (144) that slide vertically along guides (146).

14. The device according to claim 1, wherein the electric cable (20') winds on a drum of the mobile device (26') according to a path guided by rolls (156).

15. The device according to claim 1, wherein the mobile frame (10') comprises a shaped conveyor (150) or (152) for guiding the electric cable (20') associated to the mobile device (26') with interposition of one or more spacers (154).

16. The device according to claim 15, wherein the frame (10') is provided with further pairs of rolls (156) for guiding the electric cable (20') at least along the conveyors (150) and (152).

* * * * *